(12) United States Patent
Murayama

(10) Patent No.: US 8,649,717 B2
(45) Date of Patent: Feb. 11, 2014

(54) IMAGE FORMING APPARATUS AND STORING MEDIUM

(75) Inventor: Kentaro Murayama, Kasugai (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 415 days.

(21) Appl. No.: 13/036,551

(22) Filed: Feb. 28, 2011

(65) Prior Publication Data

US 2011/0211231 A1    Sep. 1, 2011

(30) Foreign Application Priority Data

Feb. 26, 2010 (JP) ................................. 2010-042443

(51) Int. Cl.
*G03G 15/01* (2006.01)
(52) U.S. Cl.
USPC .............................. 399/301; 399/49; 399/134
(58) Field of Classification Search
USPC ............................................ 399/301, 49, 134
See application file for complete search history.

(56) References Cited

U.S. PATENT DOCUMENTS

2009/0162112 A1* 6/2009 Murayama .................... 399/301
2011/0024546 A1* 2/2011 Fuwa ........................ 242/615.1

FOREIGN PATENT DOCUMENTS

| JP | H06-024047 A | 2/1994 |
|----|--------------|--------|
| JP | 2003-098795 A | 4/2003 |
| JP | 2003-167408 A | 6/2003 |
| JP | 2008-225171 A | 9/2008 |
| JP | 2009-047719 A | 3/2009 |
| JP | 2009-169031 A | 7/2009 |

OTHER PUBLICATIONS

Japan Patent Office, Notification of Reasons for Refusal for Japanese Patent Application No. 2010-042443, dispatched Jan. 24, 2012.

* cited by examiner

*Primary Examiner* — Walter L Lindsay, Jr.
*Assistant Examiner* — Roy Y Yi
(74) *Attorney, Agent, or Firm* — Baker Botts L.L.P.

(57) ABSTRACT

An image forming apparatus is provided. The image forming apparatus includes: a formation unit configured to form marks for measurement of a positional deviation on a relatively moving object; an optical sensor having a detection region on the object, and configured to output a light receiving signal depending on existence of the marks within the detection region; a removing unit configured to perform a noise removing process, including a first noise removing process and a second noise removing process which use different removing methods for removing noises included in the light receiving signal so as to generate a noise removing result; and a measurement unit configured to measure a positional deviation amount of image formed by the formation unit, based on the noise removing result.

11 Claims, 14 Drawing Sheets

| NOISE STATE | NOISE GENERATION PERIOD | NOISE SIZE | FIRST NOISE REMOVING PROCESS | SECOND NOISE REMOVING PROCESS | FIRST → SECOND | FIRST & SECOND | FIRST OR SECOND |
|---|---|---|---|---|---|---|---|
| 1 | GENERATION IN BOTH PATTERNS FOR MEASUREMENT IN SAME PERIOD | NOT MINIMUM | X | X | X | X | X |
| 2 |  | MINIMUM | O | X | O | X | O |
| 3 | GENERATION IN ONLY ONE OF PATTERNS FOR MEASUREMENT | NOT MINIMUM | X | O | O | X | X |
| 4 |  | MINIMUM | O | O | O | X | O |

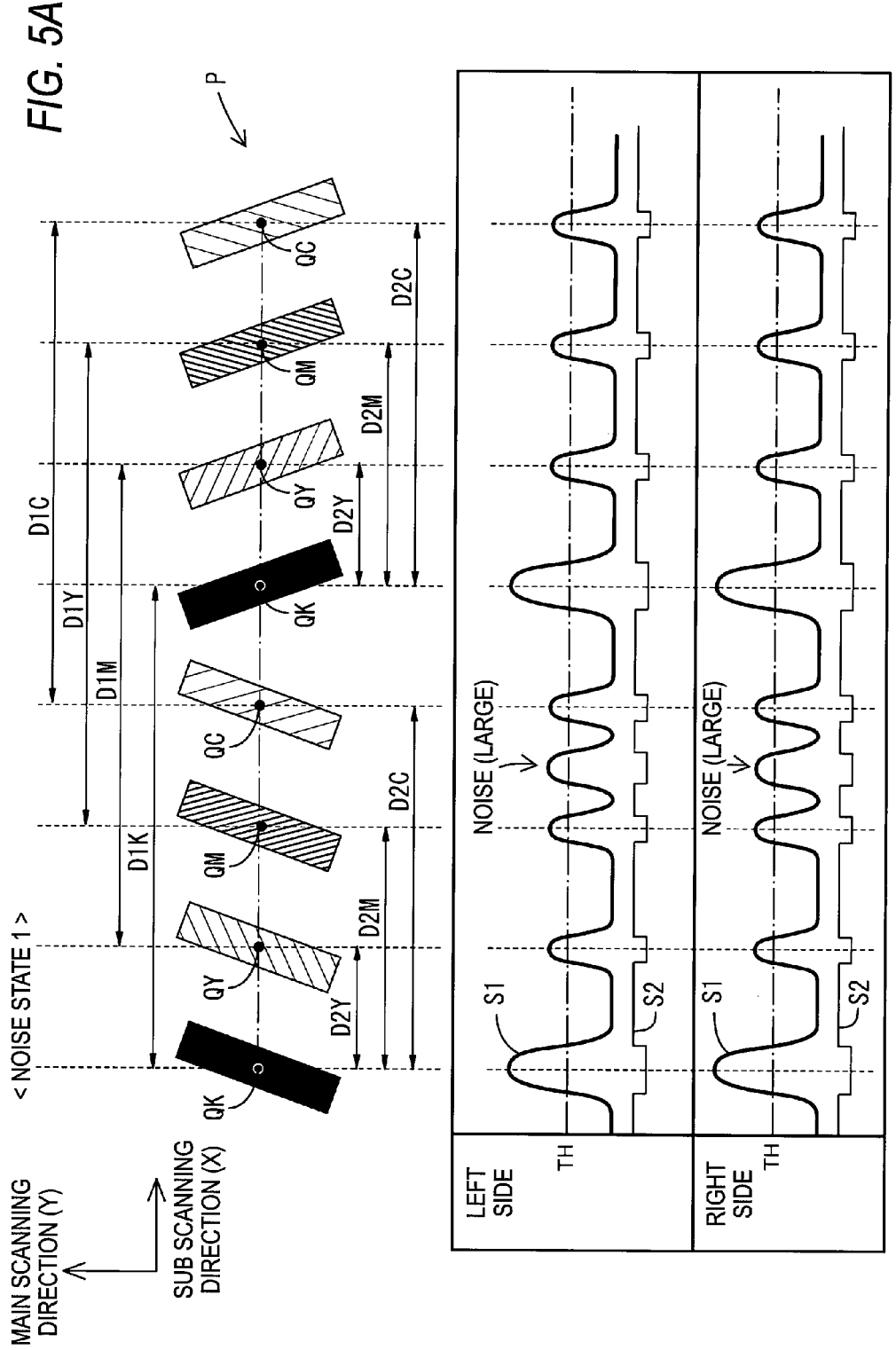

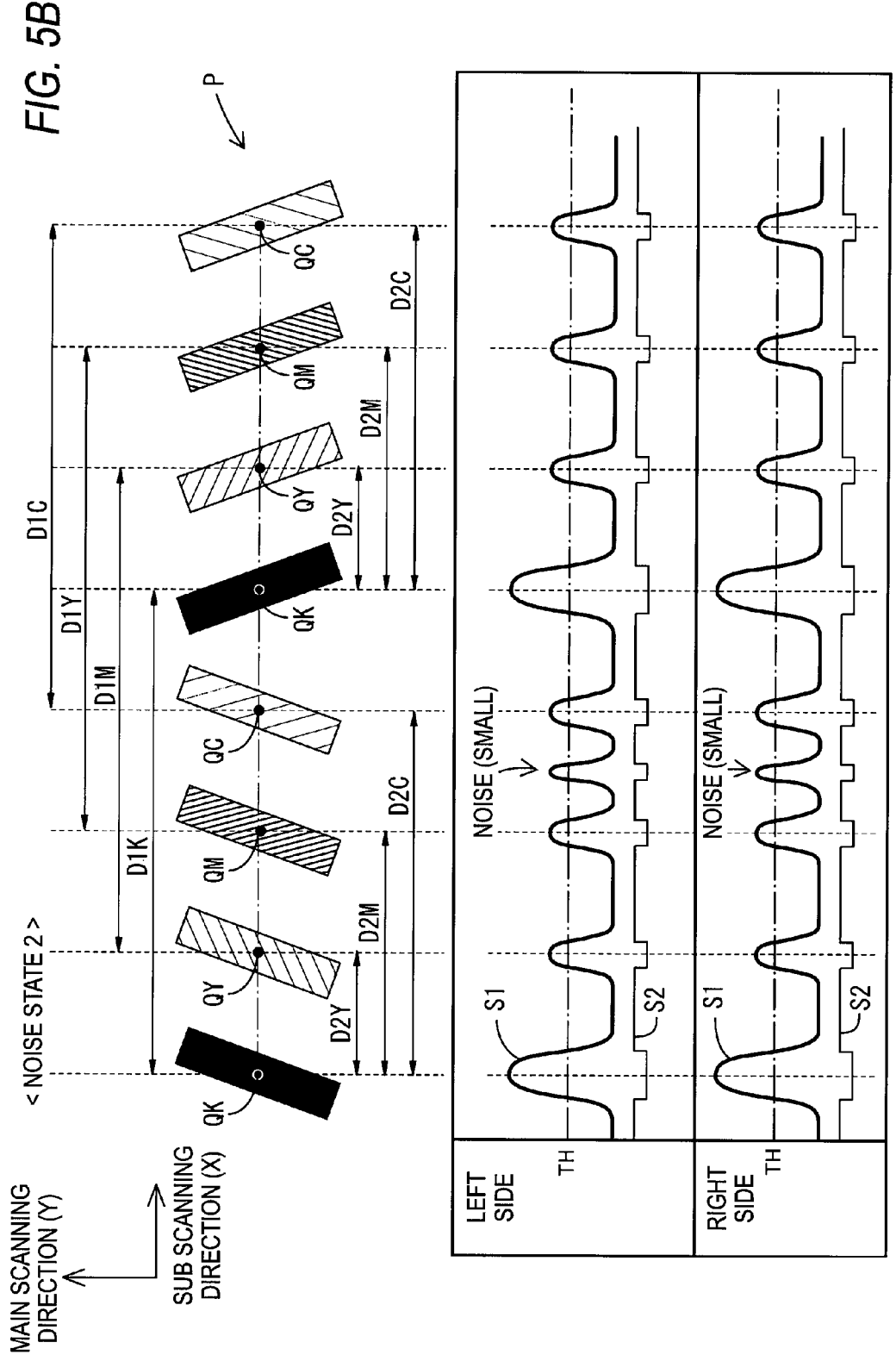

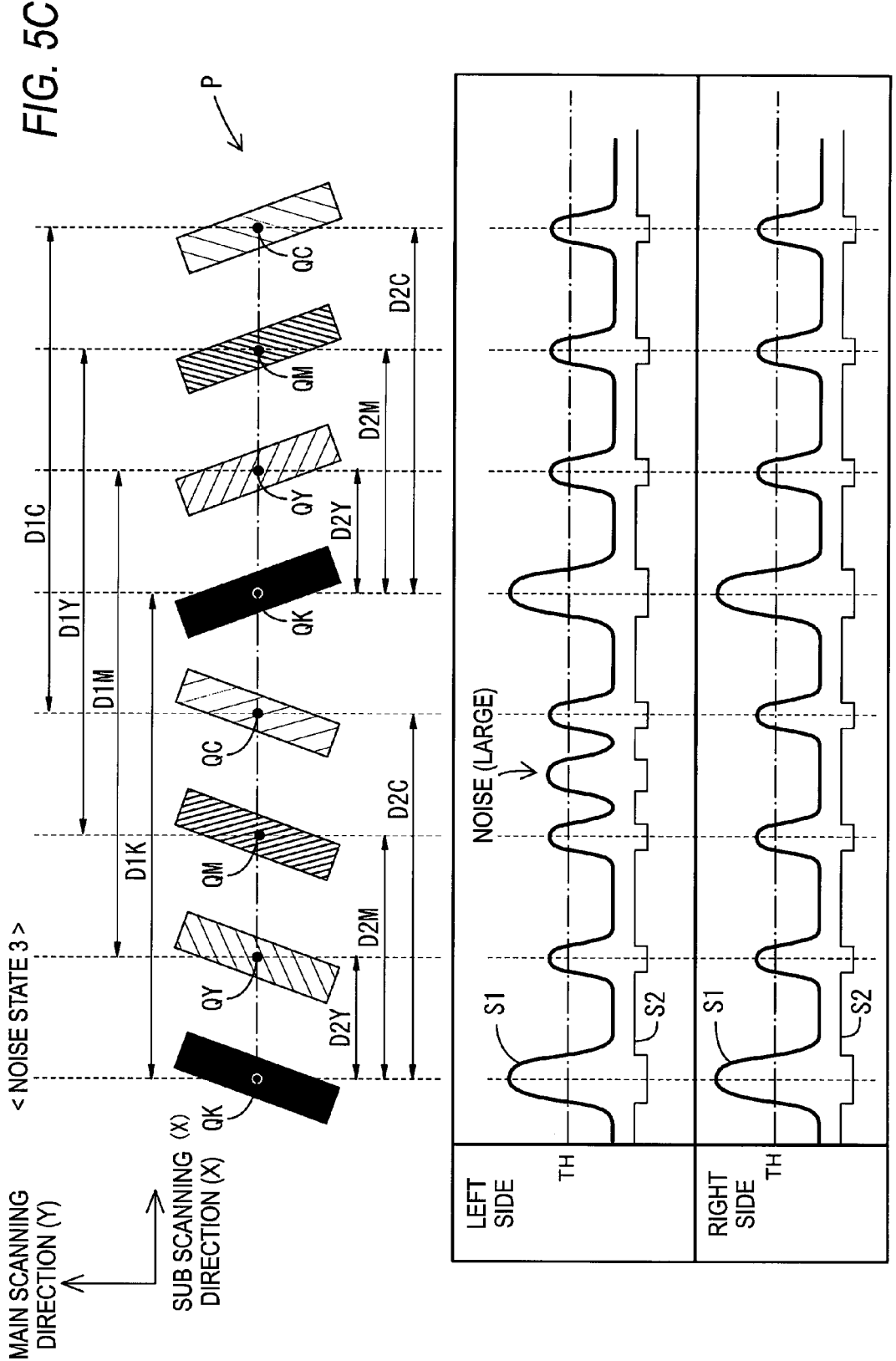

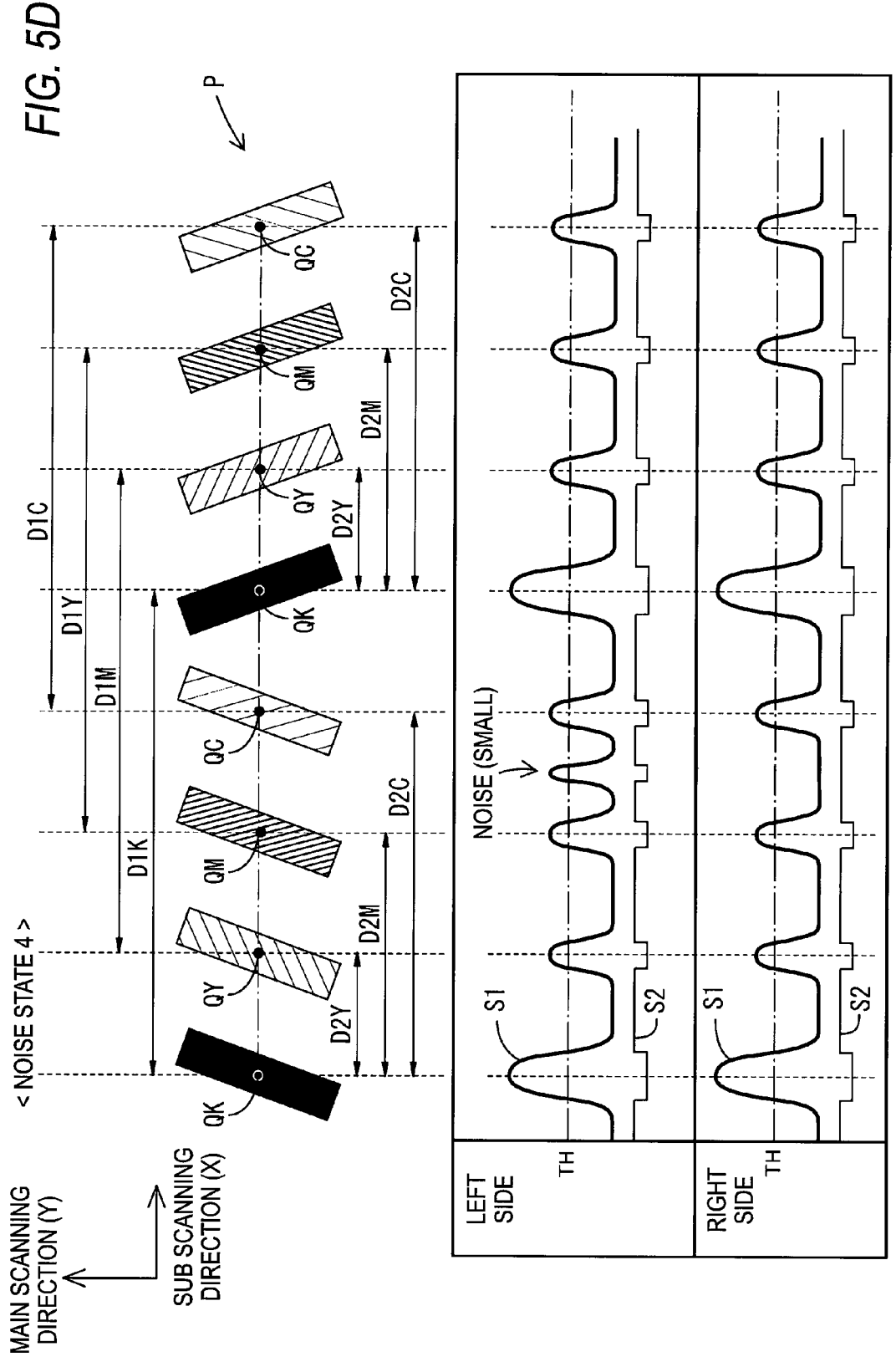

| FIG. 7A |
| FIG. 7B |

FIG. 10

| NOISE STATE | NOISE GENERATION PERIOD | NOISE SIZE | FIRST NOISE REMOVING PROCESS | SECOND NOISE REMOVING PROCESS | FIRST → SECOND | FIRST & SECOND | FIRST OR SECOND |
|---|---|---|---|---|---|---|---|
| 1 | GENERATION IN BOTH PATTERNS FOR MEASUREMENT IN SAME PERIOD | NOT MINIMUM | × | × | × | × | × |
| 2 | | MINIMUM | ○ | × | ○ | × | ○ |
| 3 | GENERATION IN ONLY ONE OF PATTERNS FOR MEASUREMENT | NOT MINIMUM | × | ○ | ○ | × | × |
| 4 | | MINIMUM | ○ | ○ | ○ | × | ○ |

IMAGE FORMING APPARATUS AND STORING MEDIUM

CROSS-REFERENCE TO RELATED APPLICATIONS

This application claims priority from Japanese Patent Application No. 2010-042443 filed on Feb. 26, 2010, the entire contents of which are incorporated herein by reference.

TECHNICAL FIELD

The present invention relates to an image forming apparatus, in particular, to an image forming apparatus, which has a function of measuring a positional deviation amount of image formation, and a storing medium storing a positional deviation amount measuring program.

BACKGROUND

There has been proposed an image forming apparatus having a function of forming marks for measurement of positional deviation on a belt, detecting position of the marks based on a light receiving signal from an optical sensor having a detection region on the belt, measuring a positional deviation amount of image formation based on the detection result, and correcting position (timing) of image formation so as to reduce the positional deviation amount. In the image forming apparatus, for example, there is a case where noises caused by scratch, dust, etc., on a belt are included in the light receiving signal, so that an accuracy of the measurement of the positional deviation amount is reduced. Accordingly, related-art discloses an image forming apparatus which compares a wave peak value of each wave of the light receiving signal with a predetermined threshold value, regards a wave having a wave peak below the predetermined threshold value as a noise, and removes the noise.

However, the related-art image forming apparatus could perform only one method for removing the noises, that is, the method of removing the noises by comparing a wave peak value and a threshold value. As such, the related-art image forming apparatus could not effectively remove noises of various wave forms (wave peak value, wave width, etc.).

SUMMARY

Accordingly, it is an aspect of the present invention to provide an image forming apparatus and a storing medium for storing a program, which are capable of removing noises of various wave forms.

According to an aspect of the present invention, there is provided an image forming apparatus comprising: a formation unit configured to form marks for measurement of a positional deviation on a relatively moving object; an optical sensor having a detection region on the object, and configured to output a light receiving signal depending on existence of the marks within the detection region; a removing unit configured to perform a noise removing process, including a first noise removing process and a second noise removing process which use different removing methods for removing noises included in the light receiving signal so as to generate a noise removing result; and a measurement unit configured to measure a positional deviation amount of image formed by the formation unit, based on the noise removing result.

According to another aspect of the present invention, there is provided a computer readable storing medium storing a computer program for causing an image forming apparatus comprising: a formation unit for forming marks for measurement of positional deviation on a relatively moving object; and an optical sensor having a detection region on the object, and configured to output a light receiving signal depending on existence of the marks within the detection region, to perform a method of: performing a first noise removing processes by using a first removing method; determining validness of a noise removing result of the first noise removing process based on whether the result of the first noise removing process satisfies a condition regarding at least one of position, color, and shape of the marks; performing a second noise removing process by using a second removing method different from the first removing method, if the noise removing result of the first noise removing process is determined to be invalid, and measuring a positional deviation amount of image formed by the formation unit, based on the noise removing result of the noise removing process.

BRIEF DESCRIPTION OF DRAWINGS

FIG. 5A is a relationship diagram of a pattern for measurement and a wave form of a light receiving signal (noise state 1);

FIG. 5B is a relationship diagram of a pattern for measurement and a wave form of a light receiving signal (noise state 2);

FIG. 5C is a relationship diagram of a pattern for measurement and a wave form of a light receiving signal (noise state 3);

FIG. 5D is a relationship diagram of a pattern for measurement and a wave form of a light receiving signal (noise state 4);

FIG. 10 is a relationship diagram of noise states and a noise removing processes;

DETAILED DESCRIPTION

Hereinafter, an exemplary embodiment of the present invention will be described with reference to the drawings.

(Overall Configuration of a Printer)

Figure 1:
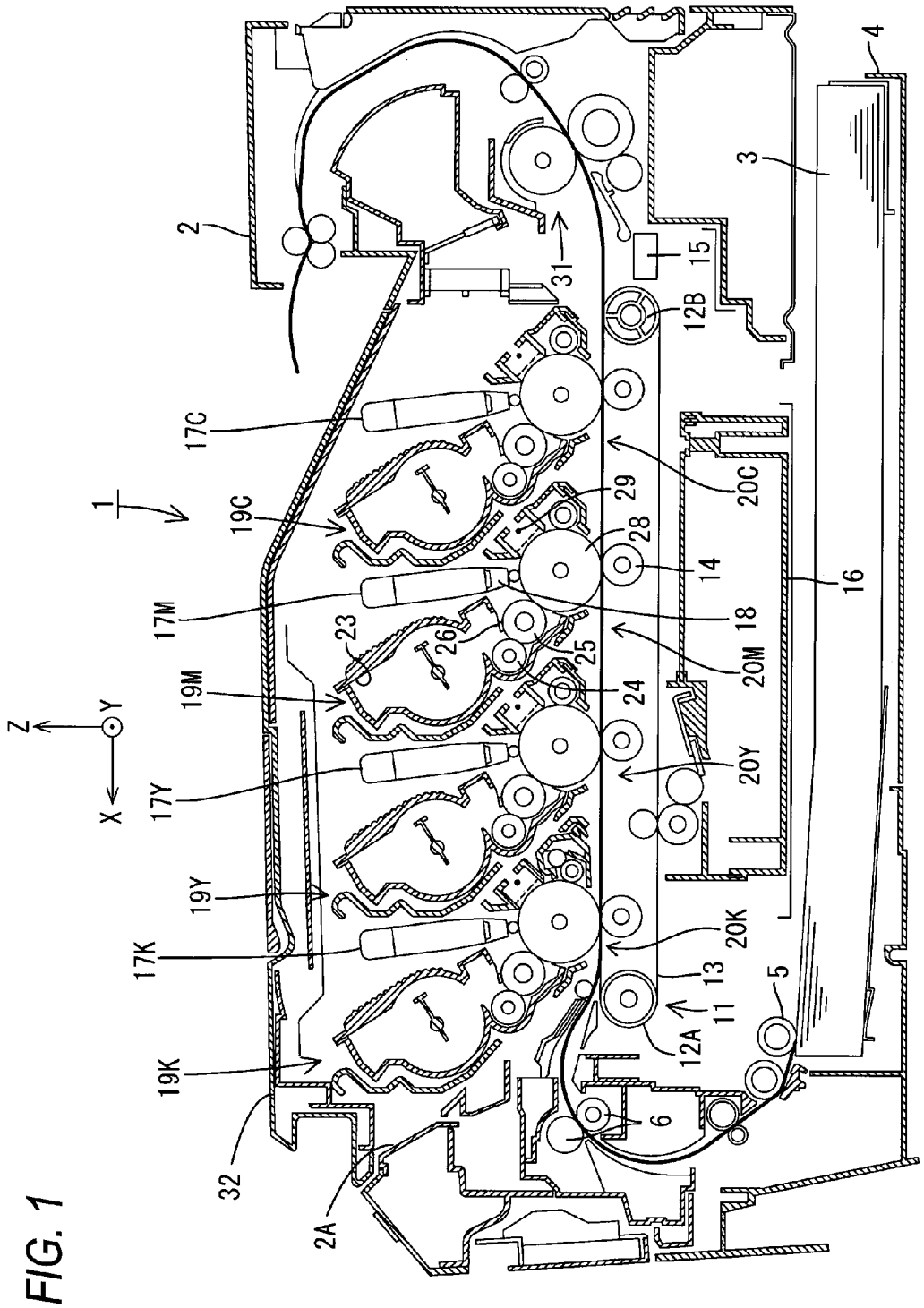
FIG. 1 is a side cross-sectional view showing a schematic configuration of a printer according to an exemplary embodiment of the present invention.

FIG. 1 is a side cross-sectional view showing schematic configuration of a printer 1 one of the exemplary embodiment of the present invention. In FIG. 1, the left side direction of the sheet plane (positive direction of X axis direction) is defined as the front side direction of the printer 1, the front surface side direction of the sheet plane (positive direction of Y axis direction) is defined as the right side direction of the printer 1 when the printer 1 is viewed from the front side thereof, and the upper direction of the sheet plane (positive direction of Z axis direction) is defined as the upper direction of the of printer 1.

The printer 1 is a color printer using a direct transfer method (direct tandem), which forms a color image by using toner in four colors (black K, yellow Y, magenta M, and cyan C) as a colorant. In the following descriptions, when discriminating each components of the printer 1 or terms between colors, K (black), C (cyan), M (magenta) and Y (yellow), which represent the respective colors, will be provided after the reference number the components and the like.

The printer 1 includes a casing 2. An opening 2A is formed on the top surface of the casing 2. A cover 32 covering the opening 2A is provided to be opened and closed based on the rear end thereof. At the bottom portion in the casing 2, a tray 4 capable of loading a plurality of sheets 3 (specifically, papers, OHP sheets, or others) is provided. A pickup roller 5 is provided upper to the front end of the tray 4. The pickup roller 5 is rotationally driven, thereby conveying the sheet 3 in the loaded on the top in the tray 4 to a registration roller 6. The registration roller 6 performs inclination correction of the sheet 3 and conveys the sheet 3 onto a belt unit 11.

The belt unit 11 is configured by a circular shaped belt 13 looping around a pairs of support rollers 12A and 12B. The belt 13 is made of resin material such as polycarbonate, and the surface thereof is mirror-finished. The rear support roller 12B is rotationally driven, whereby the belt 13 moves and circulates in the clockwise direction of the drawing paper to convey the sheet 3 electrostatically absorbed on the upper surface of the belt 13 toward the rear portion. In the inner side of the loop formed by the belt 13, four transfer rollers 14 are provided. The transfer rollers 14 respectively face photosensitive members 28 of process units 19K to 19C, which will be described later, between which the belt 13 is located.

At the rear end side or the lower side of the belt 13, a mark sensor 15 for detecting existence of marks M formed on the surface of the belt 13 upon measuring a positional deviation amount, which will be described later, is provided. Detailed configuration of the mark sensor 15 will be described later. A cleaning device 16 for removing toner (including patterns P for measurement, which will be described later) attached onto the surface of the belt 13, paper dust, or others is provided lower to the belt unit 11.

Upper to the belt unit 11, four exposure units 17K, 17Y, 17M, and 17C, and four process units 19K, 19Y, 19M, and 19C are arranged in a row in the front to rear direction. A group of formation unit 20 is configured by one of the exposure units 17K, 17Y, 17M and 17C, one of the process units 19K, 19Y, 19M and 19C, and one of the transfer rollers 14. In the printer 1, four groups of formation units 20K, 20Y, 20M, and 20C, which correspond to black, yellow, magenta, and cyan, respectively, are provided.

The exposure units 17K to 17C are supported at the lower surface of the cover 32. At the lower end of each of the exposure units 17K to 17C, a light-emitting diode (LED) head 18, in which a plurality of LEDs are arranged in line, is provided. The exposure units 17K to 17C are controlled for light emission based on image data for their respective colors and perform exposure by irradiating light from the LED heads 18 to the surfaces of the facing photosensitive members 28, line by line.

Hereinafter, the arrangement direction (front to rear direction) of the four process units 19K, 19Y, 19M, and 19C (four photosensitive units 28) will be referred to as the "sub scanning direction." The direction (right and left direction) orthogonal to the sub scanning direction will be referred to as the "main scanning direction" and is identical to the arrangement direction of the plurality of the LEDs in this exemplary embodiment.

Each of the process units 19K to 19C includes a toner containing chamber 23 containing toner for each of the colors. The lower part of each of the process units 19K to 19C includes a supply roller 24, a development roller 25, and a layer thickness restriction blade 26, etc. Toner discharged from the toner containing chamber 23 is supplied to the development roller 25 by rotation of the supply roller 24. The toner is positively charged by the frictional force between the supply roller 24 and the development roller 25.

The toner on the development roller 25 enters between the layer thickness restriction blade 26 and the development roller 25 rotation of the development roller 25. Here, the toner is further triboelectrostatically charged to a sufficient extent and dipped on the development roller 25 as a thin film having certain thickness.

Each of the process units 19K to 19C includes a photosensitive member 28 having a surface covered with a positive charging photosensitive layer, and a scorotron charger 29. Upon image formation, the photosensitive member 28 is rotationally driven, whereby the surface of the photosensitive member 28 is uniformly positively charged by the charger 29. The positively charged portion is exposed by the light exposure units 17K to 17C, so that an electrostatic latent image is formed on the surface of the photosensitive member 28.

Next, the toner on the development roller 25 is supplied to the electrostatic latent image, so that the electrostatic latent image is visualized into a toner image. Thereafter, the toner image dipped on the surface of the photosensitive member 28 is sequentially transferred on the sheet 3 by a negative transfer voltage applied to the transfer roller 14, when the sheet 3 passes a transfer position between the photosensitive unit 28 and the transfer roller 14. The sheet 3, on which the toner image has been transferred, is conveyed to a fuser 31, so that the toner image is thermally fixed. Thereafter, the sheet 3 is upwardly conveyed to be discharged from the top surface of the casing 2.

(Electrical Configuration of the Printer)

Figure 2:
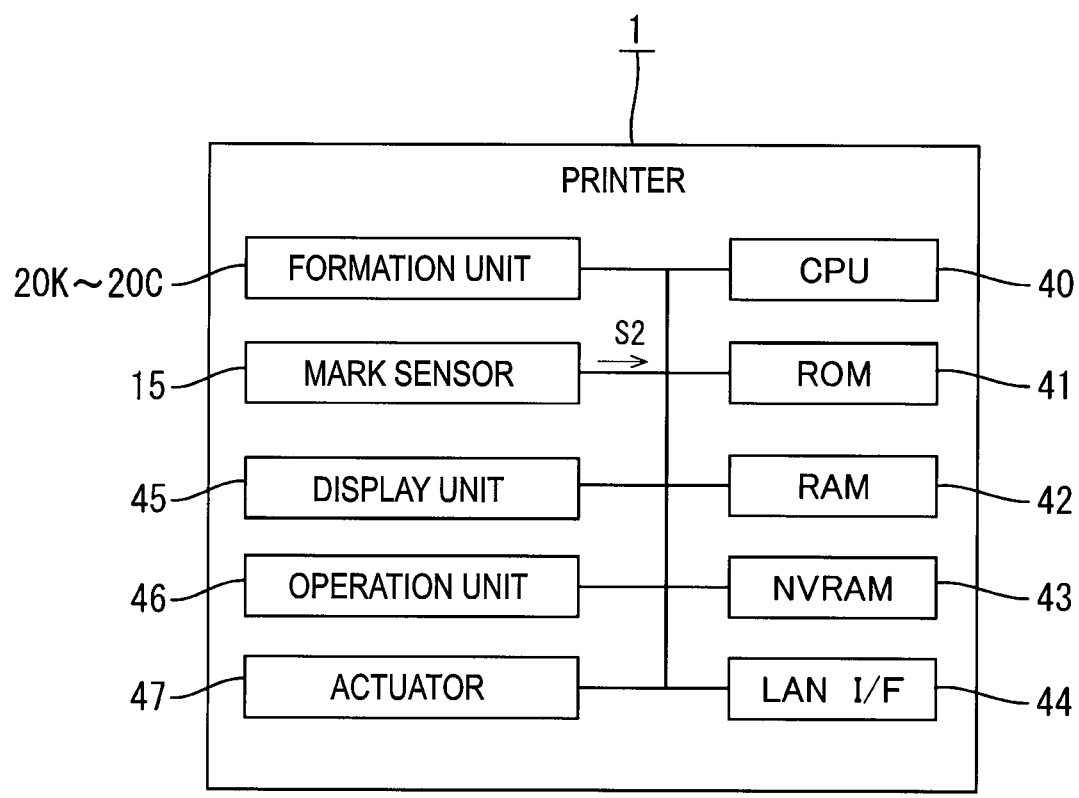
FIG. 2 is a block diagram showing a schematic electrical configuration of the printer.

FIG. 2 is a block diagram showing general electrical configuration of the printer 1. As shown in FIG. 2, the printer 1 includes a central processing unit (CPU) 40, a read-only memory (ROM) 41, a random access memory (RAM) 42, a nonvolatile random access memory (NVRAM) 43, and a network interface 44. The above-described formation units 20K to 20C, the mark sensor 15, a display unit 45, an operation unit 46, and an actuator 47 are connected to these components.

In the ROM 41, programs for performing various operations of the printer 1, such as measurement processing, which will be described later, are stored. In accordance with programs read from the ROM 41, the CPU 40 stores processing results in the RAM 42 or the NVRAM 43 and controls each unit. The network interface 44 accesses an external computer (not illustrated) or others through a communication line, thereby enabling interactive data communication.

The display unit 45 includes a liquid crystal display, a lamp, or others to display various setup screens, operation state of devices, or others. The operation unit 46 includes a plurality of buttons, so that a user can perform various input operations. The actuator 47 includes a driving motor and the like, to rotationally drive the belt 13 and the like.

(Configuration of the Mark Sensor)

Figure 3:
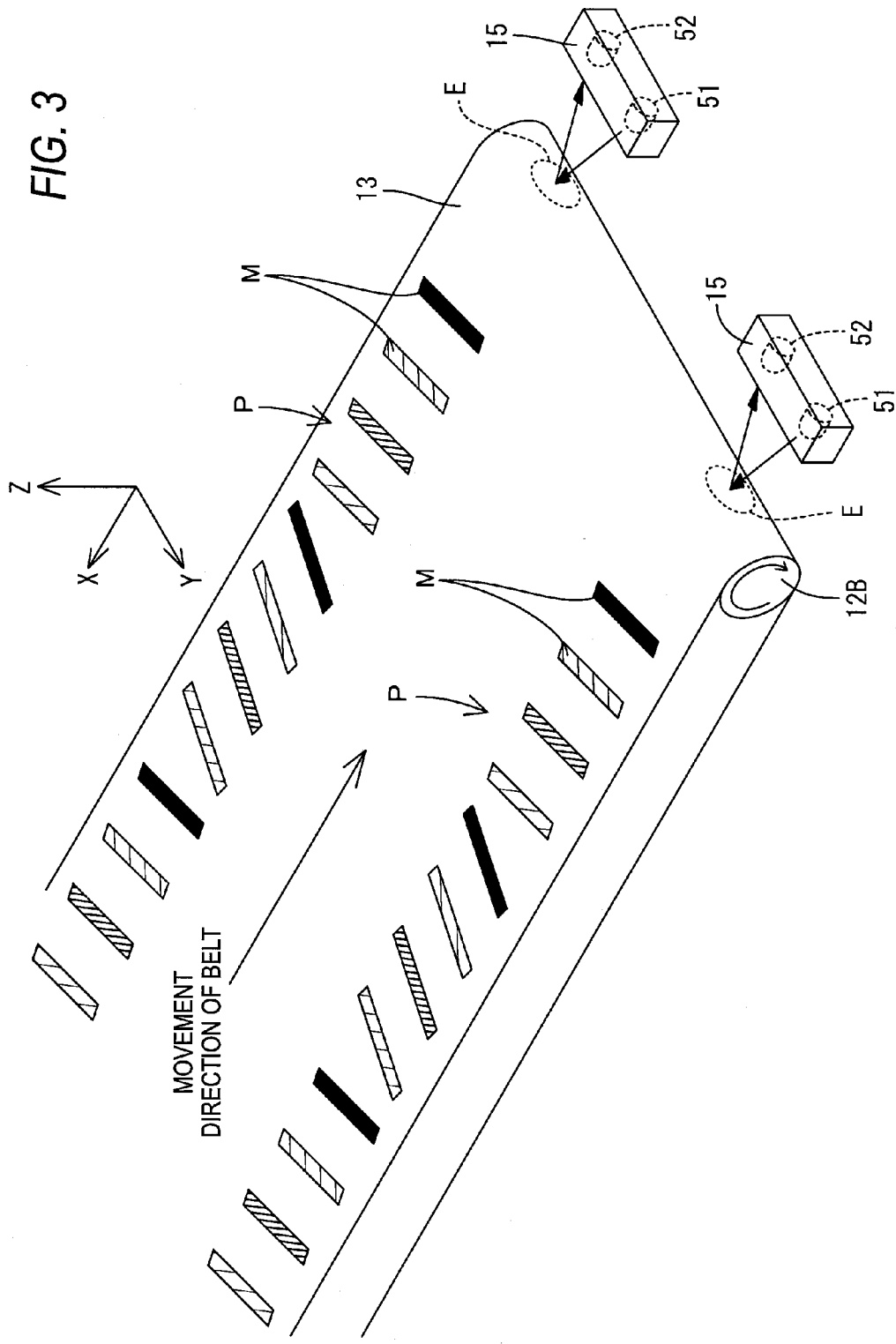
FIG. 3 is a perspective view of a mark sensor and a belt.

As shown in FIG. 3, one or a plurality of the mark sensors 15 (for example, two mark sensors in this exemplary embodiment) are provided at the rear or lower side of the belt 13 (the rear side in FIG. 3). The two mark sensors 15 are arranged side by side in the left and right direction. Upon measuring a positional deviation amount, which will be described later, patterns P for measurement of a positional deviation amount are formed in two rows on the left and right columns of the belt 13, respectively, as shown in FIG. 3. The left mark sensor 15 detects existence of marks M constituting the pattern P for measurement, which is formed on the left side of the belt 13.

The right mark sensor 15 detects existence of marks M constituting the pattern P for measurement, which is formed on the right side of the belt 13.

Each of the mark sensors 15 is a reflective optical sensor including a light emitting element 51 (for example, LED) and a light receiving element 52 (for example, photo transistor). The light emitting element 51 irradiates light in a direction oblique to the surface of the belt 13. The light receiving element 52 receives light reflected from the surface of the belt 13. A spot region formed on the belt 13 by light from the light emitting element 51 is a detection region E of the mark sensor 15. With regard to the movement direction (the rear side direction) of the belt 13, it is preferred that width of the detection region E is larger than thickness of each mark M.

Figure 4:
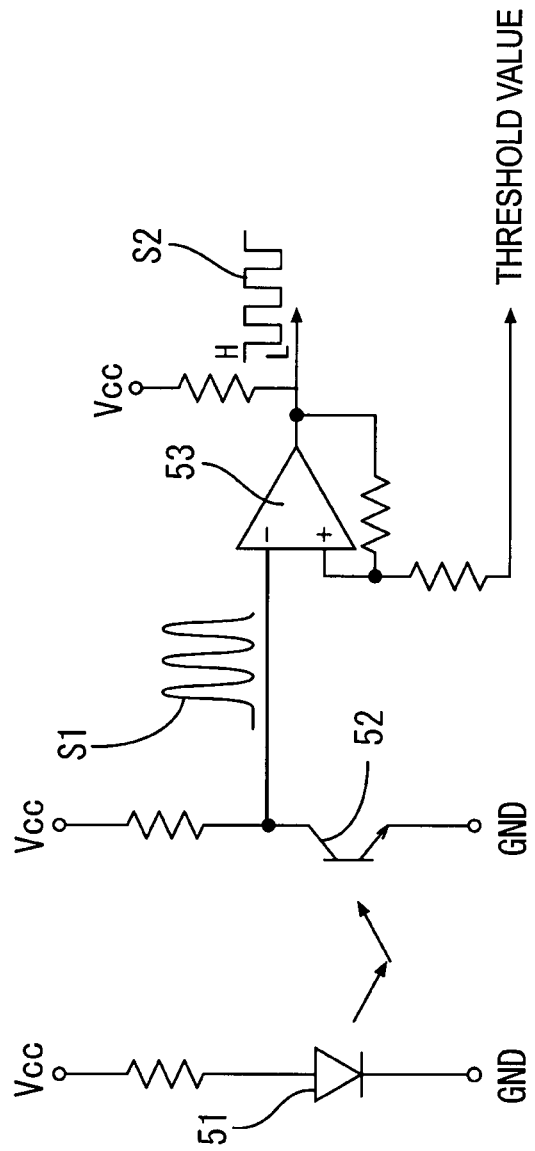
FIG. 4 shows a circuit configuration of the mark sensor.

FIG. 4 is a circuit view of the mark sensors 15. The higher an level of a light receiving amount in the light receiving element 52, the lower an level of an output signal S1 from the light receiving element 52 is, and is input into a comparison circuit 53. The comparison circuit 53 compares the output signal S1 level with a threshold value TH and outputs a binary signal S2, which is reversed in level in accordance with the comparison result. Meanwhile, as shown in FIG. 4, the comparison circuit 53 has a hysteresis comparator and compares the output signal S1 level with two threshold values. However, for easier understanding, hereinafter, the comparison circuit 53 compares the output signal S1 level with one threshold value. Accordingly, each of the mark sensors 15 outputs a binary signal S2, which is reversed in level depending on existence of marks M sequentially entering into the detection region E due to rotational driving of the belt 13.

(Configuration of Patterns for Measurement of a Positional Deviation Amount)

In FIGS. 5A to 5D, the upper column shows configuration of a pattern P for measurement, and the lower column shows wave forms of an output signal S1 and a binary signal S2 when marks M in each of the colors enter into the detection region E, for patterns P for measurement, which are formed on the left and right ends of the belt 13, respectively. In the drawings, the left and right direction of the sheet plane is the sub scanning direction.

The patterns P for measurement are used to measure a positional deviation amount in the main scanning direction and the sub scanning direction among color images formed by the formation units 20. Meanwhile, in this exemplary embodiment, black is a reference color, and yellow, magenta, and cyan are adjustment colors. Based on image formation position for the reference color, image formation position (image formation timing) for each of the adjustment colors by the formation units 20Y, 20M, and 20C on the belt 13 (sheet 3) is corrected, so that positional deviation amounts (color deviation amounts) of the adjustment colors from the reference color are cancelled. Meanwhile, although canceling is desirable, if canceling is impossible, it is preferred to reduce the positional deviation amounts, compared to at least positional deviation amounts prior to the correction.

In a pattern P for measurement, two sets of marks, wherein a black mark MK, a yellow mark MY, a magenta mark MM, and a cyan mark MC are arranged in this order to form one set of marks, form one group, and one or a plurality of the groups (five groups in this embodiment, but FIG. 5 illustrates only one group) are arranged generally along the sub scanning direction. In each group, the two sets of marks are inclined with different angles to in regard to a straight line parallel to the main scanning direction, and are symmetric in regard to the straight line.

In this exemplary embodiment, since the belt 13 is mirror-finished as described above, the belt 13 has high reflexibility compared to any toner of the four colors. Accordingly, as shown in the lower part of FIG. 5, when light from the light emitting element 51 is irradiated to the base (the surface of the belt 13, on which marks M are not formed) of the belt 13, the output signal S1 level is lowest. If light from the light emitting element 51 is irradiated on marks M formed on the belt 13, the level of a light receiving amount in the light receiving element 52 is lowered, and the output signal S1 level increases, thereby exceeding a threshold value TH. Hereinafter, a high level region of a binary signal S2 will be referred to as a "belt pulse," and a low level region will be referred to as a "mark pulse".

For example, CPU 40 calculates an intermediate position Q (intermediate timing) between a falling edge and a rising edge of a binary signal S2 and determines the intermediate position as position Q of each mark M. Hereinafter, in each group, positional deviation between marks M in the same color (QK-QK, QY-QY, QM-QM, and QC-QC) will be referred to as "the same color mark distance D1." If the position of a mark M in each color formed on the belt 13 is deviated from the main scanning direction, the same color mark distance D1 increases or decreases accordingly. Thus, difference between the same reference color mark distance D1K and the same adjustment color mark distance D1Y to D1C represents a positional deviation amount for each of the adjustment colors, mainly in the main scanning direction of an image.

In each set of marks of each group, positional deviation (QK-QY, QK-QM, QK-QC) between marks MK in the reference color and marks MY to MC in the adjustment colors is referred to as "different color mark distance D2." If the position of a mark M in each color formed on the belt 13 is deviated from the sub scanning direction, the different color mark distance D2 increases or decreases accordingly. Accordingly, difference between the different color mark distance D2 for each of the adjustment colors and an ideal value (the different color mark distance D2 when there is no positional deviation amount in the sub scanning direction) represents a positional deviation amount for each of the adjustment colors, mainly in the sub scanning direction of an image.

(Positional Deviation Amount Measurement Processing)

Figure 6:
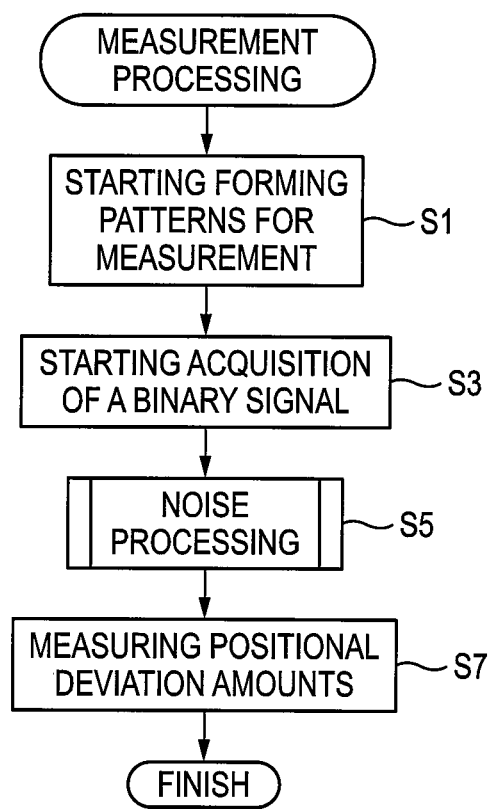
FIG. 6 shows a flow chart of a measurement processing.

FIG. 6 shows a flow chart of measurement processing. The CPU 40 performs the measurement processing when prescribed conditions are met, for example, exchange of the formation units 20 or the belt unit 11, opening and closing of the cover 32, elapse of predetermined time since a previously performed correction process, or in case of the number of sheets 3, on which images have been formed, reaches a predetermined number of sheets. In the measurement processing, patterns P for measurement are formed on the belt 13, and a positional deviation amount is measured based on a binary signal S2 from each of the mark sensors 15.

Specifically, the CPU 40 first operates the actuator 47 to rotationally move the belt 13, controls the formation units 20 to start forming the pair of patterns P for measurement on the belt 13 (S1), and starts acquiring a binary signal S2 from the mark sensors 15 (S3). Thereafter, the CPU 40 performs noise processing (S5).

Figures 7, 7A:
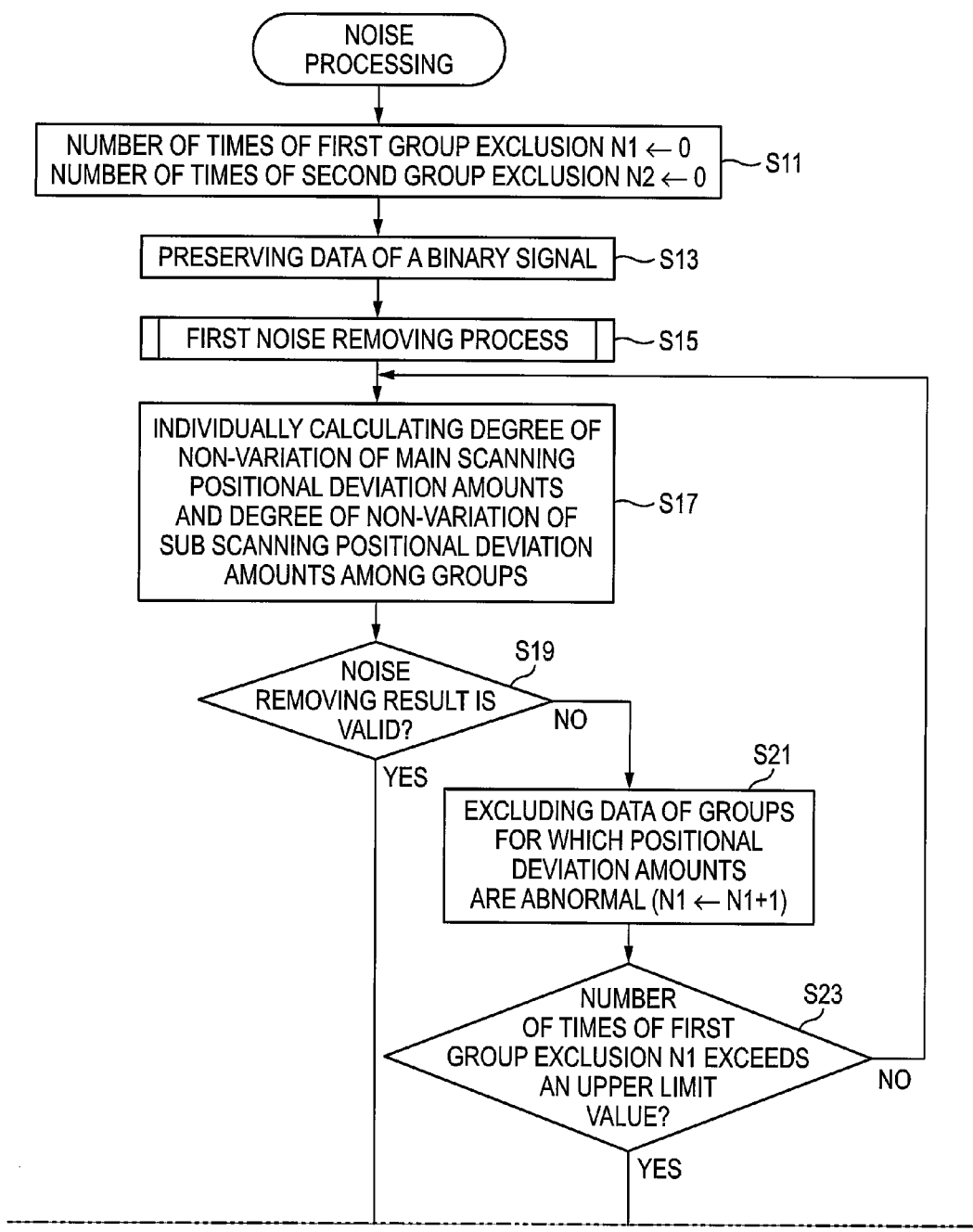
FIG. 7 (7A, 7B) shows a flow chart of a noise processing.
Figure 7B:
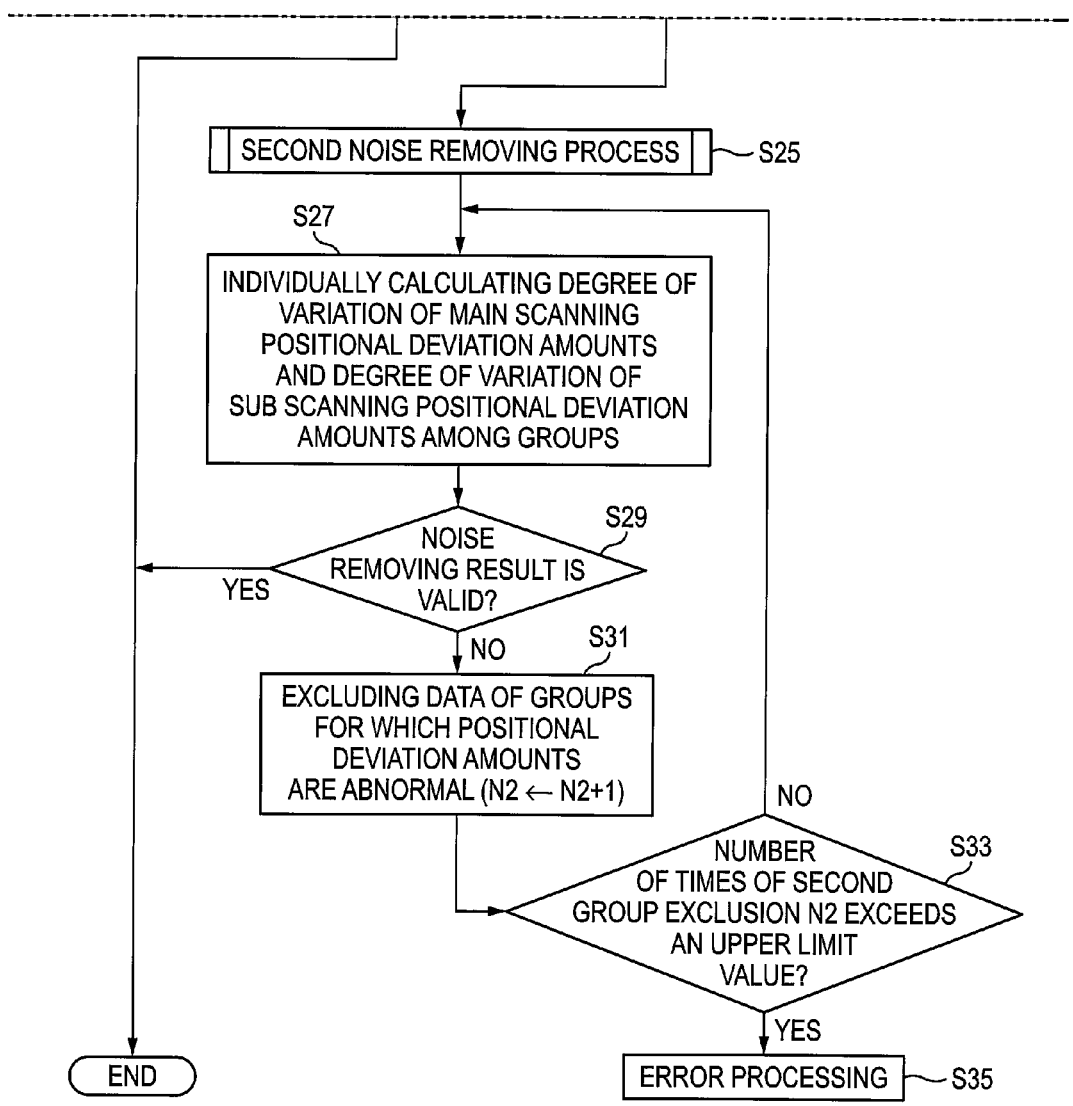

FIG. 7 shows a flow chart of noise processing. In the noise processing, a first noise removing process is performed for the binary signal S2, whether a result of the first noise removing process is valid is determined. If the result of the first noise removing process is determined to be invalid, a second noise removing process is performed.

Specifically, the CPU 40 first initializes the number of times of first group exclusion N1 and the number of times of second group exclusion N2 to zero (0) (S11), and stores data of a binary signal S2, which have been acquired from the mark sensors 15, prior to a noise removing process, for example, in the NVRAM 43 (S13). Data of a binary signal S2 is data representing characteristics of a wave form of the signal. In this exemplary embodiment, the data of a binary signal S2 is data of sequence and width of the belt pulse and the mark pulse described above. Next, the CPU 40 performs a first noise removing process (S15).

(1) First Noise Removing Process

Figure 8:
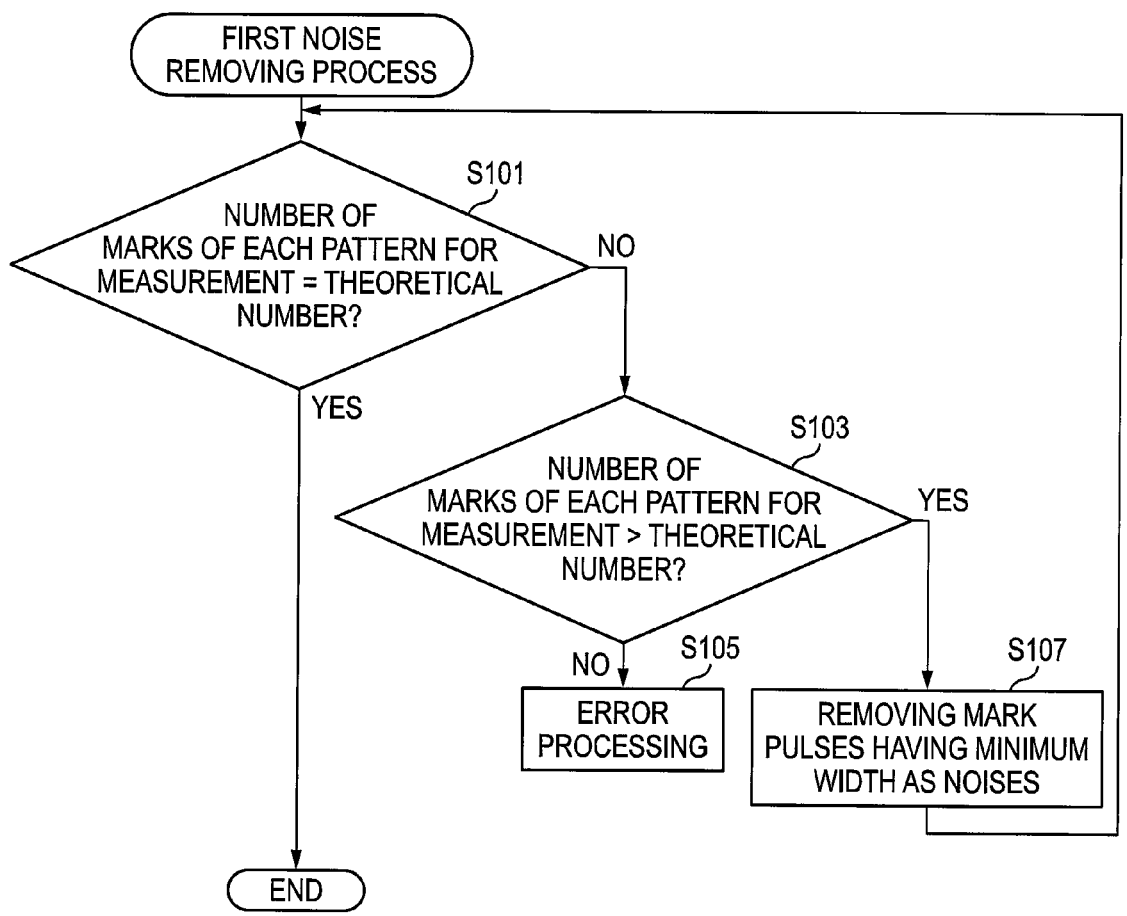
FIG. 8 shows a flow chart of a first noise removing process.

FIG. 8 shows a flow chart of a first noise removing process. The first noise removing process uses a removing method for removing the noises based on width of a mark pulse of a binary signal S2.

Specifically, the CPU 40 calculates the number of marks from the width of mark pulses for each patterns P for measurement to determine whether the number of the marks is identical to the theoretical number (S101). The theoretical number is the number of the mark pulses in the case where there are no noises, and indicates the total number of the marks M constituting one pattern P for measurement. For both patterns P for measurement, if the number of marks is identical to the theoretical number (S101: YES), CPU 40 recognizes that the binary signal S2 includes no noises and finishes the first noise removing process to proceed to S17 of FIG. 7.

If the number of marks is smaller than the theoretical number (S101: NO and S103: NO) for at least either of a pair of patterns P for measurement, since it is likely that measuring the positional deviation amount cannot be normally performed due to reasons other than noises, for example, a portion of marks M have not been formed in the step of forming patterns P for measurement, error processing is performed (S105). Examples of the error processing include stopping measurement processing or returning to S1 of FIG. 6 to start measurement processing again, or informing a user of an error message through the display unit 45 or the network interface 44.

If the number of marks is larger than the theoretical number (S101: NO and S103: YES) for at least one of a pair of patterns P for measurement, for the pattern P for measurement, the number of marks of which is larger than the theoretical number, for example, mark pulses having minimum (or maximum) width are removed as noises (S107). That, it is recognized that the mark pulse having minimum width in the binary signal S2 does not exist, and the mark pulse having the minimum width is not used for measuring a positional deviation amount. The CPU 40 consecutively perform S107 until the number of marks and the theoretical number becomes identical (S101: YES), and then finishes the first noise removing process to proceed to S17 of FIG. 7.

For example, as shown in FIGS. 5B and 5D, if the noise is small and the mark pulse corresponding to the noise is lowest, noise removing can be properly performed by using the first noise removing process. Meanwhile, as shown in FIGS. 5A and 5C, if the noise is large and the mark pulse corresponding to the noise is not lowest, the mark pulse corresponding to the mark M is removed as the noise in the first noise removing process, and thus, noise removing cannot be properly performed.

In S17 of FIG. 7, the CPU 40 calculates a degree of variation of positional deviation amounts in the main scanning direction (hereinafter, referred to as "main scanning positional deviation amounts") and degree of variation of positional deviation amounts in the sub scanning direction (hereinafter, referred to as "sub scanning positional deviation amounts") among a plurality of groups (10 groups, if groups are not excluded as described later) constituting a pair of patterns P for measurement. Specifically, the CPU 40 individually calculates a main scanning positional deviation amount and a sub scanning positional deviation amount for each groups, based on the binary signal S2 after the first noise removing process has been performed. The sub scanning positional deviation amount for each group is an average of two positional deviation amounts based on binary signals S2 corresponding to two sets of marks constituting one group, respectively.

Next, the CPU 40 individually calculates the degree of variation of the main scanning positional deviation amounts and the degree of variation of the sub scanning positional deviation amounts among groups. The degree of variation is calculated, preferably, by using, for example, one of the following methods:

Method 1: A method of determining, difference between a maximum amount and a minimum amount of the main scanning (sub scanning) positional deviation amounts among the main scanning (sub scanning) positional deviation amounts of a plurality of groups, as the degree of variation.

Method 2: A method of calculating the average of the main scanning (sub scanning) positional deviation amounts among a plurality of groups and determining difference between the average and the main scanning (sub scanning) positional deviation amount farthest from the average as the degree of variation.

Method 3: A method of determining standard deviation of the main scanning (sub scanning) positional deviation amounts among a plurality of groups as the degree of variation.

Next, the CPU 40 determines whether the result of performing the first noise removing process (binary signal S2 after the first noise removing process) is valid or not, based on the degree of variation (S19). Specifically, if both the degree of variation of the main scanning positional deviation amounts and the degree of variation of the sub scanning positional deviation amounts are below a reference variation value, the noise removing result is determined to be valid. If at least one of the degree of variation of the main scanning positional deviation amounts and the degree of variation of the sub scanning positional deviation amounts is above the reference variation value, the noise removing result is determined to be invalid. The reference variation value is a maximum value of the degree of variation of the main scanning (sub scanning) positional deviation amounts among groups when the noises have been normally removed. The reference variation value can be obtained in advance, for example, through experiments or based on experience. The reference variation value for a main scanning positional deviation amount and a sub scanning positional deviation amount may be a same value or a different value.

According to this configuration, it is possible to determine validness of a noise removing result in a relatively easy way, based on the degree of variation of positional deviation amounts among groups, without determining the deviation for each marks M.

If the noise removing result is determined to be valid (S19: YES), the CPU 40 finishes the noise processing and proceeds to S7 of FIG. 6. If the noise removing result is determined to be invalid (S19: NO), the CPU 40 extracts groups, for which the main scanning (sub scanning) positional deviation amounts are beyond a regulated range, as abnormal groups. For example, groups, for which the main scanning (sub scanning) positional deviation amounts are abnormal, or groups, for which the main scanning (sub scanning) positional deviation amounts exceed a predetermined reference amount for determination of abnormal, are extracted as abnormal groups. And, the CPU 40 removes all mark pulses corresponding to the abnormal groups as noises. As a result, it is possible to exclude the group of marks M, which significantly affect the accuracy of measurement of a positional deviation amount, as being noises. The CPU 40 adds "1" to the number of times of first group exclusion N1 (S21).

If the number of times of first group exclusion N1 is below a predetermined upper limit value (for example, once) (S23: NO), the CPU 40 returns to S17 and recalculates the degree of variation of the main scanning positional deviation amounts and the degree of variation of the sub scanning positional deviation amounts among the remaining groups, based on the binary signal S2 after the exclusion of the abnormal groups. As a result, if the noise removing result is determined to be valid (S19: YES), the CPU 40 finishes the noise processing. If the result is determined to be invalid (S19: NO), the CPU 40 performs exclusion (S21) of abnormal groups again (S21).

If the number of times of first group exclusion N1 is more than a predetermined upper limit value (S23: YES), there are no sufficient number of samples (the number of mark pulses) left to accurately measure a final main scanning (sub scanning) positional deviation amount to be used for calculation of a correction value, which will be described later. A final main scanning (sub scanning) positional deviation amount is calculated as an average of the main scanning (sub scanning) positional deviation amounts among the remaining groups, and hereinafter, will be referred to as a "main scanning (sub scanning) positional deviation amount for correction." In this case, a second noise removing process is newly performed without using the result of the first noise removing process.

(2) Second Noise Removing Process

Figure 9:
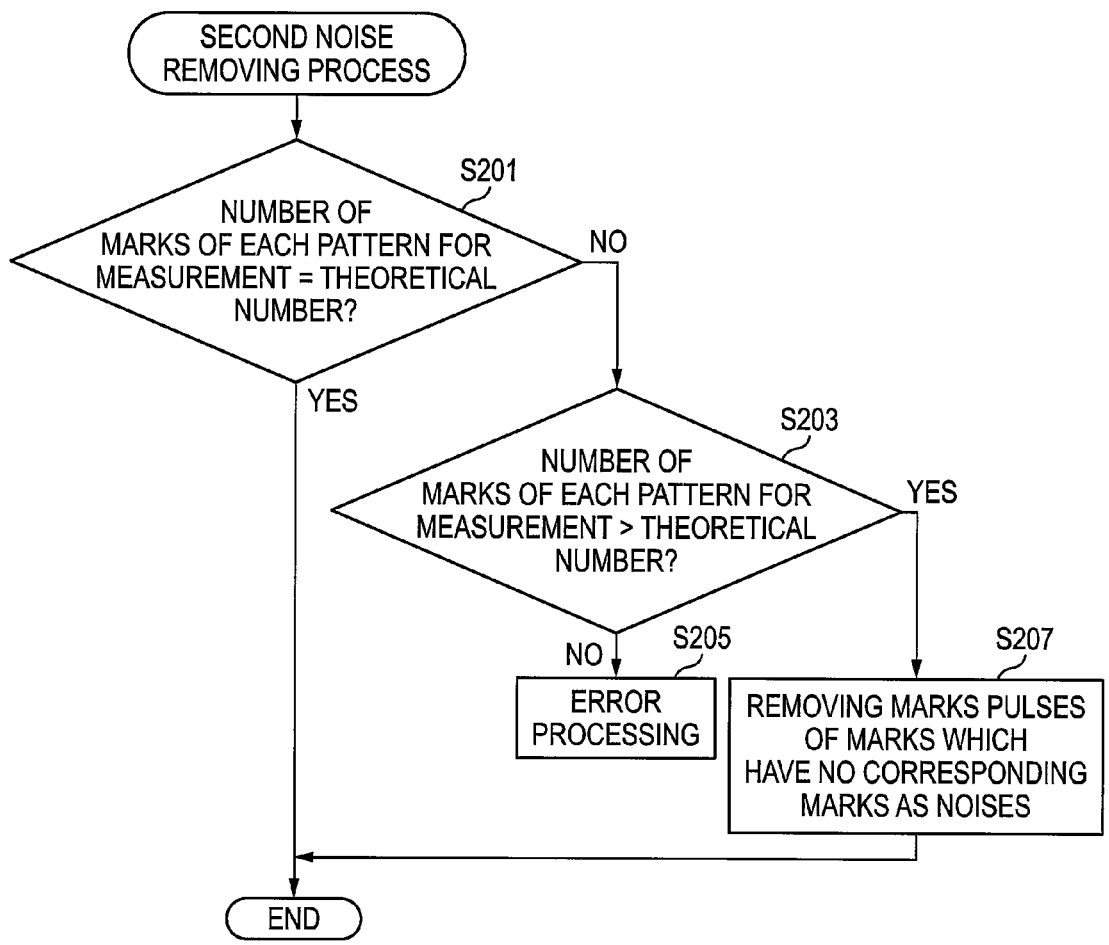
FIG. 9 shows a flow chart of a second noise removing process.

FIG. 9 shows a flow chart of a second noise removing process. The CPU 40 reads the data of the binary signal S2 before the first noise removing process had been performed, which have been preserved in the NVRAM 43 (refer to S13 of FIG. 7), and performs the second noise removing process to the stored data. The second noise removing process uses a removing method for removing the noises based on the position relation of the marks, which belong to different patterns P for measurement and correspond to each other Specifically, the CPU 40 first determines whether the number of marks and the theoretical number are identical for each of the patterns P for measurement (S201). For both patterns P for measurement, if the number of marks is identical to the theoretical number (S201: YES), the CPU 40 recognizes that the binary signal S2 includes no noises and finishes the second noise removing process to proceed to S27 of FIG. 7.

If the number of marks is smaller than the theoretical number (S201: NO and S203: NO) for at least one of a pair of patterns P for measurement, the CPU 40 performs the same error processing as in S105 (S205). If the number of marks is larger than the theoretical number (S201: NO and S203: YES) for at least one of a pair of patterns P for measurement, the CPU 40 removes the mark pulse of a mark M, which exist in one of the patterns P for measurement and the mark corresponding to M do not exist in the other pattern P for measurement, as noises (S207), and finishes the second noise removing process to proceed with S27 of FIG. 7. In this exemplary embodiment, corresponding marks indicate marks having an identical position (distance from a head mark) in patterns P for measurement. In FIG. 3, corresponding marks are marks M in the same color which are arranged in the left and right direction.

For example, as shown in FIGS. 5C and 5D, if noises are included only in a binary signal S2 of one of the patterns P for measurement in the same period, noise removing can be properly performed by using the second noise removing process. Meanwhile, as shown in FIGS. 5A and 5B, if noises are included in binary signals S2 of both patterns P for measurement in the same period, since it is regarded in the second noise removing process that the mark pulses of both patterns P corresponding to the noises corresponds to each other, noise removing cannot be properly performed.

In S27 of FIG. 7, the CPU 40 individually calculates the degree of variation of main scanning positional deviation amounts and the sub scanning positional deviation amounts among groups, as performed in S17 of FIG. 7. And, as performed in S19 of FIG. 7, the CPU 40 determines whether the result from performing the second noise removing process (binary signal S2 after the second noise removing process) is valid, based on the calculation result (S29).

If the noise removing result is determined to be valid (S29: YES), the CPU 40 finishes the noise processing and proceeds to S7 of FIG. 6. If the noise removing result is determined to be invalid (S29: NO), the CPU 40 excludes all mark pulses corresponding to abnormal groups as noises. The CPU 40 adds "1" to the number of times of second group exclusion N2 (S31).

If the number of times of second group exclusion N2 is below a predetermined upper limit value (for example, once) (S33: NO), the CPU 40 returns to S27 to recalculate the degree of variation of main scanning positional deviation amounts and the degree of variation of sub scanning positional deviation amounts among the remaining groups, based on the binary signal S2 after the exclusion of the abnormal groups. As a result, if the noise removing result is determined to be valid (S29: YES), the CPU 40 finishes the noise processing. If the noise removing result is determined to be invalid (S29: NO), the CPU 40 performs exclusion of abnormal groups again (S31).

If the number of times of second group exclusion N2 is more than a predetermined upper limit value (S33: YES), since there are no the sufficient number of samples (the number of mark pulses) left enough to accurately measure a main scanning (sub scanning) positional deviation amount for correction, for example, error processing is performed as described in S105 of FIG. 8 or S205 of FIG. 9.

In S7 of FIG. 6, the CPU 40 measures a main scanning (sub scanning) positional deviation amount for correction based on the binary signal S2 after the noise processing, and finishes the measurement processing. Next, in order to cancel the main scanning (sub scanning) positional deviation amount for correction upon image formation, the CPU 40 stores a correction value to correct image formation position (specifically, exposure timing or the like) of each of the formation units 20 on the sheet 3, for example, in the NVRAM 43.

However, if the main scanning (sub scanning) positional deviation amount for correction is beyond a predetermined reference range (less than a maximum value of a positional deviation amount assumed in advance through experiments and by experience), the CPU 40 does not calculate a correction value and maintains the correction value, which has been preserved in the NVRAM 43 based on the result of the measurement processing prior to the previous measurement processing. Like this, in this exemplary embodiment, even if the noise removing result is determined to be valid in the measurement processing, if a positional deviation amount for correction obtained from the result is within a reference range, correction (update of a correction value) of image formation position is performed. As a result, it is possible to prevent the correction being performed in a state that although the noise removing result has been determined to be valid, positional deviation cannot be exactly measured due to reasons other than noises (for example, patterns P for measurement cannot be normally formed due to lack of toner).

(Effects of the Exemplary Embodiment)

FIG. 10 is a relationship diagram of each noise state and a noise removing process. In the drawing, "O" means that a noise removing result is valid, and "X" means that a noise removing result is invalid. As shown in FIG. 10, if the first noise removing process alone is performed, noises can be normally removed only in the noise states 2 and 4 (see FIGS. 5B and 5D) (see the "First Noise Removing Process" column in FIG. 10). If the second noise removing process alone is performed, noises can be normally removed only in the noise states 3 and 4 (see FIGS. 5C and 5D) (see the "Second Noise Removing Process" column in FIG. 10).

If the measurement processing of this embodiment is performed, noises can be normally removed in the noise states 2 to 4 (see FIGS. 5B to 5D) (see the "First→Second" column in FIG. 10). Accordingly, compared to the case where the first noise removing process or the second noise removing process alone is performed, it is possible to remove noises of various patterns.

If the first noise removing process and the second noise removing process are performed, and only the noises that have been determined to be noises in the results of both the processes are removed, none of the noises is removed. That is, noises cannot be normally removed in all the noise states 1 to 4 (refer to the "First & Second" column in FIG. 10). If the first noise removing process and the second noise removing process are performed, and the noises that have been determined to be noises in at least one of the results are removed, noises can be normally performed only in the noise states 2 and 4 (see FIGS. 5B and 5D) (see the "first or second" column in FIG. 10).

In the exemplary embodiment, the second noise removing process is performed when the result from performing the first noise removing process has been determined to be invalid. By this configuration, even if noises cannot be normally removed by the first noise removing process, the noises can be normally removed by the second noise removing process. In addition, it is possible to prevent unnecessarily performing the second noise removing process when the noises had been normally removed by the first noise removing process.

In the exemplary embodiment, a plurality of noise removing processes, each of the noise removing processes using different removing methods, for removing noises included in the light receiving signal, has been described. Accordingly, it is possible to remove noises of various patterns by: performing a noise removing process suitable for each state of the printer; determining noise removal based on the results of a plurality of noise removing processes, etc.

Other Embodiments

The present invention is not limited to the exemplary embodiment that has been described above and in the drawings. The technical scope of the present invention also includes, for example, the embodiments set forth below.

(1) In the above-described exemplary embodiment describes, the "image forming apparatus" of the present invention is a color printer for forming a color image by using a direct transfer method. However, the present invention is not limited to this, and the "image forming apparatus" may be a monochrome printer. Further, the "image forming apparatus" may be a printer using an intermediate transfer method. In this case, the intermediate transfer unit is one example of an "object" of the present invention. Further, the "image forming apparatus" may be image forming apparatuses using other electrophotographic methods, such as a polygon scanning method, or may be using an inkjet method.

(2) In the above-described exemplary embodiment, patterns P for measurement are formed on the belt 13 to measure a positional deviation amount. However, the present invention is not limited to this configuration. Patterns P for measurement may be formed on the sheet 3 which is electrostatically absorbed on the belt 13. In this case, the sheet 3 is an example of the "object" of the present invention.

(3) In the first noise removing process and the second noise removing process of the above-described exemplary embodiment, noises are removed based on width of a mark pulse of the binary signal S2, namely, wave width of a wave form of a light receiving signal. However, the present invention is not limited to configuration. For example, the CPU 40 may acquire the output signal S1 as a light receiving signal and remove noises based on a wave peak value of each wave. For example, data of a wave form having a minimum (or maximum) wave peak value are removed as noises.

(4) In the above-described exemplary embodiment, the second noise removing process is performed only if the result of the first noise removing process is invalid. However, the present invention is not limited to this configuration. For example, a user may select an appropriate one of the first noise removing process and the second noise removing process, in consideration of usage environment of the printer 1, and cause the selected process to be performed. Further, both the first noise removing process and the second noise removing process may be performed, and the noise removing may be performed under AND or OR condition of the results of the processes. However, as described above, the noise removing can be performed more properly in the above-described exemplary embodiment.

Moreover, both the first noise removing process and the second noise removing process may be performed, and one of the results of the processes, which has less abnormal groups, may be used to measure a positional deviation amount for correction. Further, the performing sequence of the first noise removing process and the noise removing process may be reversed in subsequent measuring processes, depending on a result of the first noise removing process. For example, if a result of the first noise removing process has been consecutively determined to be invalid in the measurement processing performed predetermined times, the second noise removing process is first performed in the next measurement process.

(5) In the above-described exemplary embodiment, a main scanning (sub scanning) positional deviation amount obtained from the measurement processing is used for correcting image formation position. However, the present invention is not limited to this configuration. For example, an error may be informed without correcting image formation position, if a main scanning (sub scanning) positional deviation amount is beyond a predetermined amount.

(6) In the above-described exemplary embodiment, the first noise removing process and the second noise removing process have been described. However, the "noise removing processes" of the present invention are not limited to these processes. For example, a method of determining mark pulses between belt pulses having a predetermined value of width in a binary signal S2 as noises may be used. According to this method, if a positional deviation amount is somewhat small, the noise removing can be properly performed in all the noise states shown in FIG. 5. Meanwhile, the noise removing process using this removing method may be performed instead of the error processing in S35 of FIG. 7 in the above-described exemplary embodiment. The "different removing methods"

of the present invention do not include difference in threshold values for discriminating marks or noises.

(7) In the above-described embodiment, validness of a noise removing result is determined based on degree of variation (one example of "a condition regarding position of marks" in the present invention) of positional deviation amounts among groups. However, the present invention is not limited to this configuration. For example, as shown in FIG. 5, a wave form corresponding to a mark MK in the reference color is larger (high peak value and large wave width) than wave forms of marks MY, MM, and MC in the adjustment colors. Accordingly, a mark pulse corresponding to the mark MK, which is a reference color, has larger width than mark pulses corresponding to marks MY, MM, and MC which are adjustment colors. Accordingly, validness of a noise removing result may be determined based on whether an appearance sequence of the mark pulse having the large width is identical to the theoretical appearance sequence based on patterns P for measurement (one example of "a condition regarding color of marks" in the present invention). According to this configuration, it is possible to determine validness of a noise removing result in a relatively easy way, based on difference in at least one of color and form of each of a plurality of marks, without determining position relation of the plurality of marks.

Further, in the above-described exemplary embodiment, all marks M have an identical shape. However, the shape of some of the marks may be changed. From difference in the shape of marks, it is possible to discriminate large and small wave forms (peak value, wave width, and wave steepness) of a light receiving signal. Validness of a noise removing result may be determined based on whether the sequence of appearance of the large and small wave forms is identical to the theoretical appearance sequence based on patterns P for measurement (one example of "a condition regarding shape of marks" in the present invention).

(8) In the above-described exemplary embodiment, an example, in which the present invention is applied to measurement of both a main scanning positional deviation amount and a sub scanning positional deviation amount, has been described. However, the present invention may be applied to measurement of one of the amounts. For example, if the present invention is applied to measurement of a sub scanning positional deviation amount, in determining validness of a noise removing result in FIG. 7 (S19 and S29), the noise removing result is determined to be valid if a degree of variation of the sub scanning positional deviation amounts among groups is within a regulated range.

(9) In the above-described exemplary embodiment, the first noise removing process and the second noise removing process have been described. However, the "noise removing processes" of the present invention may also include other noise removing processes which uses removing methods other than the removing method used in the first removing process and the removing method used in the second removing process.

What is claimed is:

1. An image forming apparatus comprising:
a formation unit configured to form marks for measurement of a positional deviation on a relatively moving object;
an optical sensor having a detection region on the object, and configured to output a light receiving signal depending on existence of the marks within the detection region;
a removing unit configured to perform a first noise removing process and a second noise removing process which use different removing methods for removing noises included in the light receiving signal; and
a measurement unit configured to measure a positional deviation amount of image formed by the formation unit, based on a noise removing result obtained by performing one of the first noise removing process and the second noise removing process.

2. An image forming apparatus comprising:
a formation unit configured to form marks for measurement of a positional deviation on a relatively moving object;
an optical sensor having a detection region on the object, and configured to output a light receiving signal depending on existence of the marks within the detection region;
a removing unit configured to perform a noise removing process, including a first noise removing process and a second noise removing process which use different removing methods for removing noises included in the light receiving signal so as to generate a noise removing result;
a measurement unit configured to measure a positional deviation amount of image formed by the formation unit, based on the noise removing result,
wherein the removing unit performs the first noise removing process, and
wherein the removing unit performs the second noise removing process if the noise removing result of the first noise removing process is determined to be invalid.

3. The image forming apparatus claimed in claim 2, wherein the removing unit is configured to determine validness of the noise removing result of the first noise removing process based on whether the noise removing result of the first noise removing process satisfies a condition regarding at least one of position, color, and shape of the marks.

4. The image forming apparatus claimed in claim 3, wherein the formation unit is configured to form a plurality of marks, which are different in at least one of color and shape, and
wherein the removing unit determines the validness of the noise removing result of the first noise removing process based on whether the noise removing result of the first noise removing process satisfies a condition regarding the difference of each of the plurality of marks.

5. The image forming apparatus claimed in claim 3, wherein the formation unit is configured to form a plurality of groups, each of which includes a plurality of marks, and
wherein the removing unit is configured to measure the positional deviation amounts of each of the groups based on the noise moving result of the first noise removing process, and determines the validness of the noise removing result of the first noise removing process based on a degree of variation of the positional deviation amounts among the groups.

6. The image forming apparatus claimed in claim 2, further comprising:
a storing unit configured to store the light receiving signal,
wherein the second noise removing process is performed by using the light receiving signal stored in the storing unit, to which the first noise removing process is not performed.

7. An image forming apparatus comprising:
a formation unit configured to form marks for measurement of a positional deviation on a relatively moving object;

an optical sensor having a detection region on the object, and configured to output a light receiving signal depending on existence of the marks within the detection region;

a removing unit configured to perform a noise removing process, including a first noise removing process and a second noise removing process which use different removing methods for removing noises included in the light receiving signal so as to generate a noise removing result;

a measurement unit configured to measure a positional deviation amount of image formed by the formation unit, based on the noise removing result, wherein the formation unit is configured to form a plurality of groups, each of which including of a plurality of marks, and wherein one of the first and second noise removing processes uses the removing method of measuring the positional deviation amounts of each of the groups based on the light receiving signal, and removing a light receiving signal portion corresponding to the group, for which the positional deviation amount is beyond a regulated range, as a noise.

8. An image forming apparatus comprising:

a formation unit configured to form marks for measurement of a positional deviation on a relatively moving object;

an optical sensor having a detection region on the object, and configured to output a light receiving signal depending on existence of the marks within the detection region;

a removing unit configured to perform a noise removing process, including a first noise removing process and a second noise removing process which use different removing methods for removing noises included in the light receiving signal so as to generate a noise removing result;

a measurement unit configured to measure a positional deviation amount of image formed by the formation unit, based on the noise removing result, wherein one of the first and second noise removing processes uses the removing method of removing the noise based on a size of a wave form of the light receiving signal, and an other of the first and second noise removing processes uses the removing method of removing the noise based on a positional relation between corresponding marks.

9. An image forming apparatus comprising:

a formation unit configured to form marks for measurement of a positional deviation on a relatively moving object;

an optical sensor having a detection region on the object, and configured to output a light receiving signal depending on existence of the marks within the detection region;

a removing unit configured to perform a noise removing process, including a first noise removing process and a second noise removing process which use different removing methods for removing noises included in the light receiving signal so as to generate a noise removing result;

a measurement unit configured to measure a positional deviation amount of image formed by the formation unit, based on the noise removing result, a correction unit configured to correct a position of the image formed by the formation unit so as to reduce the positional deviation amounts measured by the measurement unit, wherein the removing unit is configured to determine validness of the noise removing result, and wherein, if the noise removing result has been determined to be valid, the removing unit controls the correction unit to perform correction only if the positional deviation amounts based on the noise removing result is within a reference range.

10. The image forming apparatus claimed in claim 9, wherein the removing unit is configured to determine validness of the noise removing result based on whether the noise removing result satisfies a condition regarding at least one of position, color, and shape of the marks.

11. A computer readable storing medium storing a computer program for causing an image forming apparatus comprising: a formation unit for forming marks for measurement of positional deviation on a relatively moving object; and an optical sensor having a detection region on the object, and configured to output a light receiving signal depending on existence of the marks within the detection region, to perform a method of:

performing a first noise removing process by using a first removing method;

determining validness of a noise removing result of the first noise removing process based on whether the result of the first noise removing process satisfies a condition regarding at least one of position, color, and shape of the marks;

performing a second noise removing process by using a second removing method different from the first removing method, if the noise removing result of the first noise removing process is determined to be invalid, and measuring a positional deviation amount of image formed by the formation unit, based on the noise removing result of the noise removing process.

* * * * *